United States Patent
Andrews et al.

(10) Patent No.: US 9,812,874 B2
(45) Date of Patent: Nov. 7, 2017

(54) DISTRIBUTED LOW VOLTAGE POWER SYSTEMS

(71) Applicant: Cooper Technologies Company, Houston, TX (US)

(72) Inventors: James Christopher Andrews, Mableton, GA (US); Kenneth Dale Walma, Peachtree City, GA (US); William Lee Shiley, Peachtree City, GA (US); Liang Fang, Peachtree City, GA (US); James Moan, Peachtree City, GA (US); Brian Eugene Elwell, Tyrone, GA (US); Anthony Audenzio Mangiaracina, Sharpsburg, GA (US); Michael Troy Winslett, Fairburn, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/216,384

(22) Filed: Jul. 21, 2016

(65) Prior Publication Data
US 2016/0329722 A1    Nov. 10, 2016

Related U.S. Application Data

(63) Continuation of application No. 14/695,535, filed on Apr. 24, 2015, now Pat. No. 9,647,459.
(Continued)

(51) Int. Cl.
*H05B 37/02*    (2006.01)
*H02J 4/00*    (2006.01)
*H02J 13/00*    (2006.01)

(52) U.S. Cl.
CPC ............ *H02J 4/00* (2013.01); *H02J 13/0003* (2013.01); *H05B 37/02* (2013.01); *Y10T 307/25* (2015.04); *Y10T 307/406* (2015.04)

(58) Field of Classification Search
CPC .................................. H02J 4/00; H05B 37/02
See application file for complete search history.

(56) References Cited

U.S. PATENT DOCUMENTS

| | | | |
|---|---|---|---|
| 8,502,470 B2 * | 8/2013 | Barnett | H02J 1/14 307/38 |
| 2007/0145826 A1 * | 6/2007 | Clark | H05B 37/0254 307/11 |

(Continued)

FOREIGN PATENT DOCUMENTS

| WO | WO 03/039022 | 5/2003 |
|---|---|---|
| WO | WO 2011/039601 | 4/2011 |
| WO | WO 2011/079912 | 7/2011 |

OTHER PUBLICATIONS

International Search Report for PCT/US2015/032263, dated Jul. 17, 2015.

*Primary Examiner* — Tung X Le
*Assistant Examiner* — Raymond R Chai
(74) *Attorney, Agent, or Firm* — King & Spalding LLP

(57) ABSTRACT

A distributed low voltage power system is disclosed herein. The system can include a power source generating line voltage power, and a first line voltage cable having a first line voltage end and a second line voltage end, where the first line voltage end is coupled to the power source. The system can also include a first power distribution module (PDM) comprising a first power transfer device and a first output channel. The system can further include a first LV cable having a first LV end and a second LV end, where the first LV end is coupled to the first output channel of the first PDM. The system can also include at least one first LV (Continued)

device operating on the first LV signal, where the second LV end of the first LV cable is coupled to the at least one first LV device.

20 Claims, 4 Drawing Sheets

Related U.S. Application Data

(60) Provisional application No. 62/003,607, filed on May 28, 2014.

(56) References Cited

U.S. PATENT DOCUMENTS

| | | | | |
|---|---|---|---|---|
| 2007/0222399 | A1* | 9/2007 | Bondy | F21S 2/00 315/291 |
| 2010/0052536 | A1* | 3/2010 | Zielinski | H05B 33/0857 315/77 |
| 2011/0062888 | A1 | 3/2011 | Bondy et al. | |
| 2012/0068618 | A1* | 3/2012 | Koski | H05B 33/0851 315/240 |
| 2012/0133298 | A1 | 5/2012 | Campbell | |
| 2012/0181865 | A1* | 7/2012 | Muthu | H02J 1/08 307/26 |
| 2012/0267953 | A1* | 10/2012 | Doyle | H02M 1/44 307/31 |
| 2012/0283891 | A1* | 11/2012 | Merkel | H02J 1/06 700/295 |
| 2013/0147367 | A1* | 6/2013 | Cowburn | H05B 37/0254 315/152 |
| 2015/0130369 | A1 | 5/2015 | Lovato | |
| 2015/0349535 | A1* | 12/2015 | Andrews | H02J 4/00 315/297 |

* cited by examiner

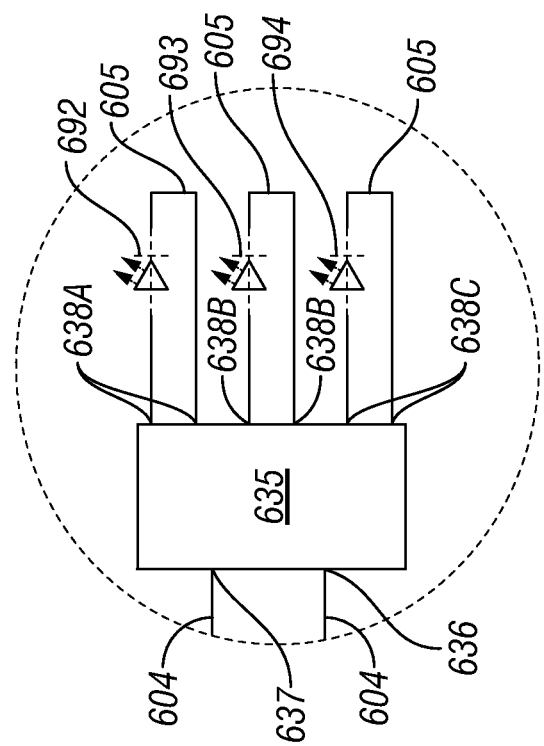
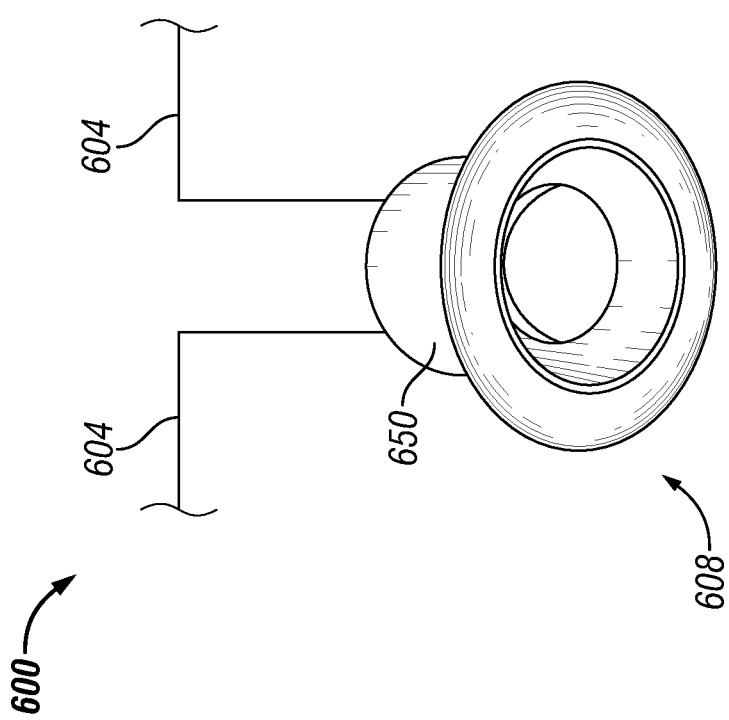

DISTRIBUTED LOW VOLTAGE POWER SYSTEMS

CROSS-REFERENCE TO RELATED APPLICATIONS

This application is a continuation application of and claims priority under 35 U.S.C. §120 to U.S. patent application Ser. No. 14/695,535, titled "Distributed Low Voltage Power Systems" and filed on Apr. 24, 2015, which claims priority under 35 U.S.C. §119 to U.S. Provisional Patent Application Ser. No. 62/003,607, titled "Distributed Low Voltage Power Systems" and filed on May 28, 2014. The entire contents of these aforementioned applications are hereby incorporated herein by reference.

TECHNICAL FIELD

Embodiments described herein relate generally to power distribution systems, and more particularly to systems, methods, and devices for low voltage power distribution systems.

BACKGROUND

Certain devices within distributed power systems can operate on different types (e.g., direct current (DC), alternating current (AC)) and/or amounts (e.g., 24V, 2 A, 120V, 50 mA) of power relative to the type and amount of power that feeds the distributed power system. Further, the devices receiving power from the device distributing the power within the distributed power system can be located relatively close.

SUMMARY

In general, in one aspect, the disclosure relates to a distributed low voltage power system. The distributed low voltage power system can include a power source generating line voltage power. The distributed low voltage power system can also include a first line voltage cable having a first line voltage end and a second line voltage end, where the first line voltage end is coupled to the power source. The distributed low voltage power system can further include a first power distribution module (PDM) having a first power transfer device, where the second line voltage end of the first line voltage cable is coupled to the first PDM, where the first PDM receives the input power from the power source through the first line voltage cable, where the first power transfer device generates a first low-voltage (LV) signal from the input power, and where the first PDM comprises a first output channel. The distributed low voltage power system can also include a first LV cable having a first LV end and a second LV end, where the first LV end is coupled to the first output channel of the first PDM. The distributed low voltage power system can further include at least one first LV device operating on the first LV signal, where the second LV end of the first LV cable is coupled to the at least one first LV device, where the at least one first LV device receives the first LV signal from the first PDM through the first LV cable.

In another aspect, the disclosure can generally relate to a power distribution module. The power distribution module can include an input portion configured to receive high-voltage (HV) power from a power source. The power distribution module can also include a power transfer device electrically coupled to the input portion, where the power transfer device is configured to generate at least one low-voltage (LV) signal using the line voltage power. The power distribution module can further include an output section electrically coupled to the power transfer device and having a number of channels, where each channel of the output section is configured to deliver the at least one LV signal for use by at least one LV device.

In yet another aspect, the disclosure can generally relate to a method for distributing low voltage power within a system. The method can include receiving line voltage power from a power source. The method can also include generating a first low-voltage (LV) signal using the line voltage power. The method can further include sending, through a first output channel, the first LV signal to at least one LV device. The first LV signal can operate the at least one LV device.

In still another aspect, the disclosure can generally relate to a multiple output channel point-of-load (POL) control module. The multiple output channel point-of-load (POL) control module can include an input portion configured to receive at least one low-voltage (LV) signal. The multiple output channel point-of-load (POL) control module can also include a controller device electrically coupled to the input potion, where the controller device is configured to generate at least one distributed LV signal based on the at least one LV signal. The multiple output channel point-of-load (POL) control module can further include an output section electrically coupled to the controller device and having a number of channels, where each channel of the output section is configured to deliver the at least one distributed LV signal for use by at least one LV device.

These and other aspects, objects, features, and embodiments will be apparent from the following description and the appended claims.

BRIEF DESCRIPTION OF THE DRAWINGS

The drawings illustrate only example embodiments of distributed low voltage power systems and are therefore not to be considered limiting of its scope, as distributed low voltage power systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 6A and 6B show a system diagram of yet another distributed low voltage power system in accordance with certain example embodiments.

DETAILED DESCRIPTION OF EXAMPLE EMBODIMENTS

Figure 1:
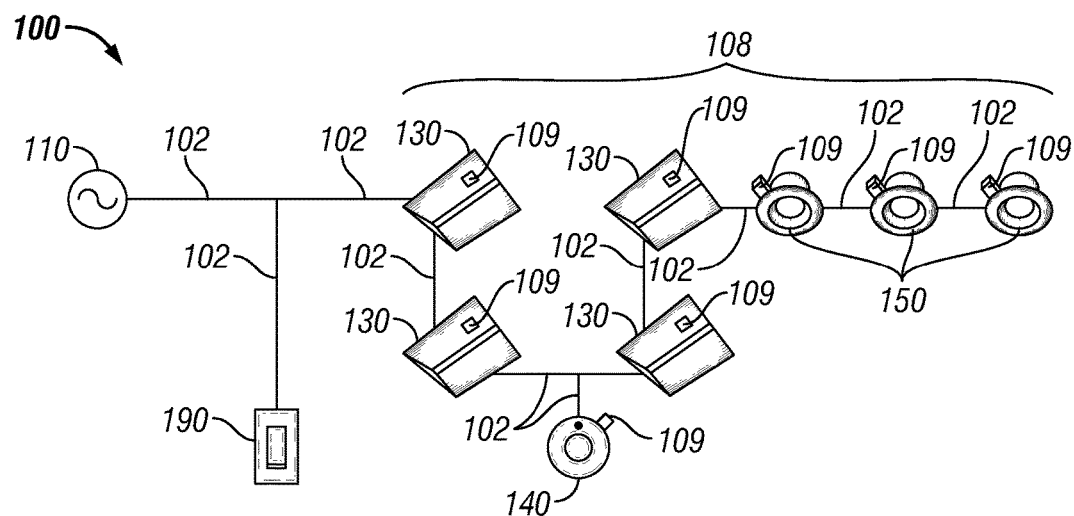
FIG. 1 shows a system diagram of a distributed power system currently known in the art.

The example embodiments discussed herein are directed to systems, apparatuses, and methods of distributed low voltage power systems. While example embodiments described herein are directed to use with lighting systems, example embodiments can also be used in systems having other types of devices. Examples of such other systems can include, but are not limited to, security systems, fire protection systems, emergency management systems, and assembly systems. Thus, example embodiments are not limited to use with lighting systems.

As described herein, a user can be any person that interacts with example distributed low voltage power systems. Examples of a user may include, but are not limited to, a consumer, an electrician, an engineer, a mechanic, a pipe fitter, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In certain example embodiments, the distributed low voltage power systems (or portions thereof) described herein meet one or more of a number of standards, codes, regulations, and/or other requirements established and maintained by one or more entities. Examples of such entities include, but are not limited to, Underwriters' Laboratories, the Institute of Electrical and Electronics Engineers, and the National Fire Protection Association. For example, wiring (the wire itself and/or the installation of such wire) that electrically couples an example PDM (defined below) with a device may fall within one or more standards set forth in the National Electric Code (NEC). Specifically, the NEC defines Class 1 circuits and Class 2 circuits under various Articles, depending on the application of use.

Class 1 circuits under the NEC typically operate using line voltages (e.g., between 120 VAC and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VA, no more than 60 VDC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits can be installed by someone other than a licensed electrical professional.

As another example, the International Electrotechnical Commission (IEC) sets and maintains multiple standards and categorizations of electrical supply for a system. One such categorization is separated or safety extra-low voltage (SELV) is an electrical system in which the voltage cannot exceed 25 V AC RMS (root-mean-square) (35 V AC peak) or 60 V DC under dry, normal conditions, and under single-fault conditions, including earth faults in other circuits. Another such categorization is protected extra-low voltage (PELV) is an electrical system in which the voltage cannot exceed 25 V AC RMS (35 V AC peak) or 60 V DC under dry, normal conditions, and under single-fault conditions, except earth faults in other circuits. Yet another such categorization is functional extra-low voltage (FELV) is an electrical system in which the voltage cannot exceed 25 V AC RMS (35 V AC peak) or 60 V DC under normal conditions.

Example embodiments of distributed low voltage power systems will be described more fully hereinafter with reference to the accompanying drawings, in which example embodiments of distributed low voltage power systems are shown. Distributed low voltage power systems may, however, be embodied in many different forms and should not be construed as limited to the example embodiments set forth herein. Rather, these example embodiments are provided so that this disclosure will be thorough and complete, and will fully convey the scope of distributed low voltage power systems to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of distributed low voltage power systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a distributed power system 100 currently known in the art. The system 100 of FIG. 1 includes a power source 110, a number (in this case, four) of troffer lights 130, a number (in this case, three) of can lights 150, a number (in this case, one) of sensing devices 140, and a number (in this case, one) of controllers 190. All of these components of the system 100 are electrically coupled to each other by a number of line voltage cables 102. Operational components of the system 100 (or any system described herein), such as the troffer lights 130, the can lights 150, and the sensing devices 140, can be referred to generally as "LV devices".

The sensing device 140 can be any device that detects one or more conditions. Examples of a sensing device 140 can include, but are not limited to, a photocell, a motion detector, an audio detector, a pressure detector, a temperature sensor, and an air flow sensor. The controller 190 can be any device that controls one or more of the other devices in the system 100. Examples of a controller 190 can include, but are not limited to, a thermostat, a dimmer switch, a control switch, a control panel, and a power switch.

The power source 110 generates and/or delivers, directly or indirectly, electrical power that is a higher voltage than the voltage ultimately used by the various low-voltage (LV) devices (e.g., troffer lights 130, can lights 150, sensing device 140) in the system 100. The power generated or delivered by the power source 110 can be called line voltage power. The line voltage power is a power that is typically delivered to a house, building, or other similar structure that supplies electricity located within or proximate to such structure. The power source 110 can also generate DC power. Examples of voltages generated by the power source 110 can include 120 VAC, 240 VAC, 277 VAC, and 480 VAC. If the line voltage power is AC power, the frequency can be 50 Hz, 60 Hz, or some other frequency. Examples of a power source 110 can include, but are not limited to, a battery, a solar panel, a wind turbine, a power capacitor, an energy storage device, a power transformer, a fuel cell, a generator, and a circuit panel. As defined herein, a line voltage includes any of a number of voltages that is typically at least as great as the maximum LV signal (described below), and that is typically a nominal service voltage such as 120 VAC, 277 VAC, or 480 VDC.

The line voltage power is sent, directly or indirectly, from the power source 110 to the other components of the system 100 using the line voltage cables 102. The line voltage cables 102 can include one or more conductors made of one or more electrically conductive materials (e.g., copper, aluminum). The size (e.g., gauge) of the line voltage cables 102 (and/or conductors therein) are sufficient to carry the line voltage power of the power source 110. Each line voltage cable 102 may be coated with an insulator made of any suitable material (e.g., rubber, plastic) to keep the electrical conductors electrically isolated from any other conductor in the line voltage cable 102.

In certain example embodiments, one or more of the LV devices 108 (in this case, the light troffers 130, the can lights 150, the sensing device 140, and the controller 190) in the system 100 that receive the line voltage power from the power source 110 use an amount and/or type (e.g., DC, AC) of power that is different from the amount and type of line voltage power generated by the power source 110. For example, the line voltage power can be AC power, and the LV devices 108 of the system 100 require DC power to operate. In such a case, the device can include a local power transfer device (not shown). A local power transfer device can be used to receive line voltage power from a line voltage cable 102 and to output LV power (also called a LV signal), where the LV power can be used by the associated LV device 108. As defined herein, a LV signal has a voltage that does not exceed approximately 42.4 VAC (root mean square) or 60 VDC.

The power transfer device can include one or more of a number of components that alter the amount and/or a type of the line voltage power. Such components can include, but are not limited to, a transformer (for raising or lowering a level of AC power), a rectifier (for generating DC power from AC power), and an inverter (for generating AC power from DC power). The power transfer device can include solid state components and/or discrete components (e.g., resistors, capacitors, diodes).

In embodiments currently used in the art, each LV device 108 (e.g., the troffer lights 130, the can lights 150, the sensing device 140) has its own point-of-load (POL) control device 109. Each POL control device 109 (also called, among other names, a driver or a ballast) is usually located within a housing of the LV device 108 and is designed to receive a LV signal. When a LV signal is received by the POL control device 109, the POL control device 109 provides power regulation and control to the LV device 108.

Each POL control device 109 currently used in the art has only a single output channel, and so only enables a single function (e.g., dimming, enable a particular color light) of a single LV device 108.

Systems currently known in the art, such as the system 100 shown in FIG. 1, involve at least a line voltage signal (e.g., 120 VAC-277 VAC), which may also include a low voltage signal (defined below). In any case, the inclusion of line voltage signals delivered to LV devices 108 (e.g., troffer lights 130, sensing devices 140) cannot be classified as a "safe" system under currently-existing standards and/or regulations. For example, such a system cannot be considered a NEC Class 2 system. As another example, such a system cannot be considered free from risk of fire and/or electrical shock.

Further, using a combination of existing technologies cannot logically or rationally be combined to achieve the example systems described herein. In some cases, modifying one or more existing systems known in the art to achieve the example systems described herein would require changing the entire architecture of that system, essentially rendering the existing system inoperable. For example, an existing system known in the art that uses a programmable logic controller (PLC) to control individual devices in the system would have to be prohibitively altered to feed varying low voltage signals to devices coupled to the same PLC channel.

As another example, a number of existing systems known in the art send low voltage signals to a single device, either on its own or in parallel with other devices, rather than multiple devices in series. Put another way, existing systems operate on a point-to-point architecture, and so require "homerun" wiring between a device and a controller. This architecture is, by definition, required because such systems known in the art operate on a "power over Ethernet" or PoE model. As discussed below, example systems described herein do not use Ethernet cables.

Figure 2:
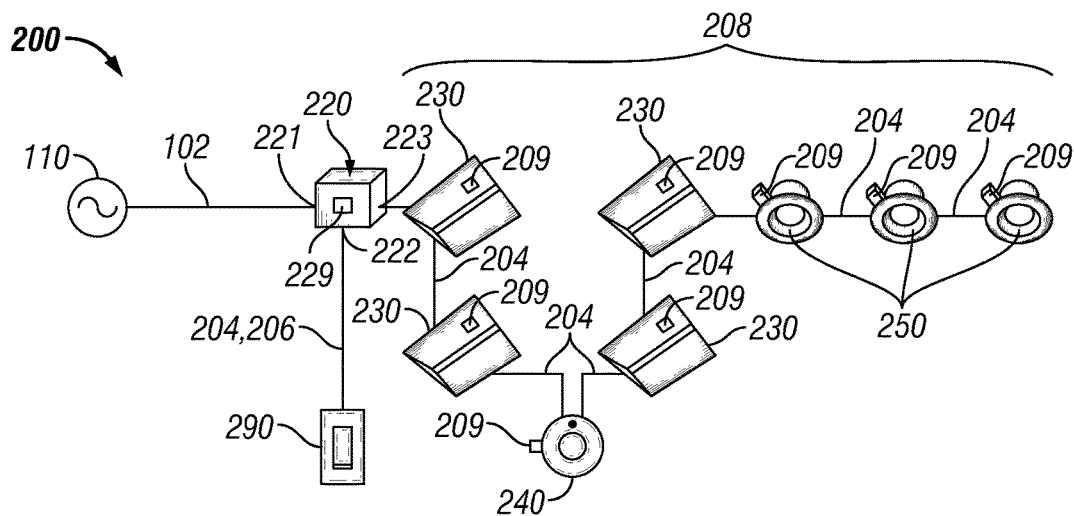
FIG. 2 shows a system diagram of a distributed low voltage power system in accordance with certain example embodiments.

FIG. 2 shows a system diagram of a distributed low voltage power system 200 in accordance with certain example embodiments. In one or more embodiments, one or more of the components shown in FIG. 2 may be omitted, repeated, and/or substituted. Accordingly, embodiments of distributed low voltage power systems should not be considered limited to the specific arrangements of components shown in FIG. 2.

Referring to FIGS. 1 and 2, the system 200 of FIG. 2 differs from the system 100 of FIG. 1 in several respects. The power source 110 and line voltage cable 102 in the system 200 of FIG. 2 are substantially the same as they are in the system 100 of FIG. 1. Further, the LV devices 208 (in this case, the troffer lights 230, the can lights 250, the controller 290, and the sensing device 240 (e.g., an occupancy sensor, a daylight sensor, an air quality sensor, a temperature sensor, a pressure sensor)) are substantially the same as the corresponding LV devices 108 of the system 100 of FIG. 1, except that the LV devices 208 of the system 200 of FIG. 2 may not have a power transfer device.

Specifically, the LV devices 208 (e.g., the troffer lights 230, the can lights 250, the controller 290, and the sensing device 240) of FIG. 2 may not require a power transfer device because the power that each of these devices receive is LV power in a type and amount (e.g., 100 W, 48 VDC) used by such devices. In certain example embodiments, a LV device 208 can include or be coupled to a power transfer device that receives the LV signal and generates, using a POL control module 209 and the LV signal, a level and type of power used by the LV device 208. However, one or more of these LV devices 208 can have a local controller function that performs one or more of a number of functions. Such functions can include, but are not limited to, receiving instructions (as from the power distribution module 220 or PDM 220), collecting and recording operational data, recording communications with the PDM 220 and/or other devices, and sending operational data to the PDM 220 and/or other devices.

The example LV devices 208 (e.g., the troffer lights 230, the can lights 250, the sensing device 240) listed above are not meant to be limiting. Examples of other LV devices 208 that can receive and use (directly or indirectly) LV signals from the PDM 220 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

The troffer lights 230, the can lights 250, the controller 290, and the sensing device 240 are each electrically coupled, directly or indirectly, to the PDM 220. The PDM 220 is electrically coupled to the power source 110 using the line voltage cable 102. The PDM 220 can include a power transfer device that generates one or more of a number of LV signals for one or more of the LV devices 208 (e.g., the troffer lights 230, the can lights 250, the sensing device 240) in the system 200. The PDM 220 can have an input portion (e.g., input channel 221), an output portion (e.g., output channel 222, output channel 223), and the power transfer device 229. The power transfer device 229 of the PDM 220 can be essentially the same as the power transfer device described above for each of the devices in the system 100 of FIG. 1.

In certain example embodiments, the input portion of the PDM 220 can include one or more input channels 221 that receive the line voltage power from the power source 110. When the PDM 220 has multiple input channels 221, each input channel 211 can have the same, or different, amount and/or type of line voltage as the other input channels 221 of the PDM 220. The output portion of the PDM 220 can include one or more of a number (e.g., one, two, five, ten) of output channels (e.g., output channel 222, output channel 223), where each output channel (also called an outlet channel) of the output section delivers one or more LV signals for use by one or more LV devices 208 of the system 200 that are electrically coupled to that output channel of the output portion of the PDM 220.

The amount and/or type of power of the LV signal of one output channel can be substantially the same as, or different than, the amount and/or type of power of the LV signal of another output channel of the output portion of the PDM 220. For example, each output channel of the PDM 220 can output 100 W, 48 VDC of power (also called the LV signal). The LV signals delivered by an output channel of the PDM 220 can be at a constant level and/or a variable level. The LV signals can change a state (e.g., on, off, dim, standby) of one or more devices. In addition, or in the alternative, the LV signal can send data (e.g., instructions, requests, information, status).

In certain example embodiments, one or more LV cables 204 are used to electrically couple, directly or indirectly, each of the LV devices 208 (e.g., the troffer lights 230, the can lights 250, the sensing device 240) in the system 200 to the PDM 220. The LV cables 204 can have one or more pairs of conductors. Each pair of conductors of the LV cable 204 can deliver LV signals that represent power signals and/or communication signals. In some cases, a LV cable 204 has at least one pair of conductors that carries power signals and at least one pair of conductors that carries control signals. The LV cables 204 can be plenum rated. For example, one or more of the LV cables 204 can be used in drop ceilings without conduit or cable trays.

The PDM 220 can also communicate, using an output channel (in this case, output channel 222) with one or more controllers 290 using a communication link 206. The communication link 206 can be a LV cable 204, Ethernet cable, or some other wired technology. In addition, or in the alternative, the communication link 206 can be a network using wireless technology (e.g., Wi-Fi, Zigbee, 6LoPan). The controller 290 can be communicably coupled to one or more other systems in addition to the PDM 220 of the system 200. Similarly, the PDM 220 can be coupled to one or more other PDMs in one or more other systems. The system 200 can have multiple PDMs 220, where each PDM 220 of the system 200 provides LV power and communicates (sends and receives data) with each other, a controller 290, and/or one or more LV devices 208.

In addition to the capabilities of the controller 190 listed above with respect to FIG. 1, the controller 290 of FIG. 2 can communicate with (e.g., send instructions to, receive data about one or more LV devices 208 from) the PDM 220. Instructions sent by the controller 290 to the PDM 220 can affect the operation of all devices coupled to one or more particular channels of the PDM 220, particular devices coupled to one or more particular channels of the PDM 220, or any combination thereof. Communication between the PDM 220, the controller 290, and the controllers in one or more devices of the system 200 can include the transfer (sending and/or receiving) of data. Communications between the PDM 220, the controller 290, and/or a LV device 208 (e.g., the troffer lights 230, the can lights 250, the sensing device 240) can be made through the LV cables 204 and/or the communication link 206, using wired and/or wireless technology.

Such data can include instructions, status reports, notifications, and/or any other type of information. Specific examples of data and/or instructions sent between the PDM 220, the controller 290, and/or a LV device 208 (e.g., the troffer lights 230, the can lights 250, the sensing device 240) can include, but are not limited to, a light level, a light fade rate, a demand response, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, an a device identifier.

Communications between the PDM 220, the controller 290, and/or a LV device 208 (e.g., the troffer lights 230, the can lights 250, the sensing device 240) can be based on one or more of a number of factors. For example, communications can be based on an algorithm or formula set forth in software and/or hardware within one or more components of the system 200. As another example, communications can be based on events associated with a LV device 208 or other component of the system. Such events can include, but are not limited to, light intensity, an emergency condition, demand response, passage of time, and a time sweep.

Communications between the PDM 220, the controller 290, and/or a LV device 208 (e.g., the troffer lights 230, the can lights 250, the sensing device 240) can be made through the LV cables 204 and/or the communication link 206, using wired and/or wireless technology.

In certain example embodiments, the PDM 220 can include communication and diagnostic capabilities. Communications can be with the controller 290, one or more devices coupled to the PDM 220, other PDMs 220 in the system 200, a user device, and/or any other component of the system 200. Diagnostic capabilities can be for operations of the system 200 overall, for operations of the PDM 220, for operations of one or more LV devices 208 coupled to the PDM 220, for operations of one or more other PDMs in the system 200, and/or for any other components of the system 200.

The PDM 220, the controller 290, and/or the POL controllers 209 of one or more LV devices 208 can include a hardware processor-based component that executes software instructions using integrated circuits, discrete components, and/or other mechanical and/or electronic architecture. In addition, or in the alternative, the PDM 220, the controller 290, and/or the POL controllers 209 of one or more LV devices 208 can include one or more of a number of non-hardware-based components. An example of such a non-hardware-based components can include one or more field programmable gate arrays (FPGA).

Using FPGAs and/or other similar devices known in the art allows the PDM 220, the controller 290, and/or the POL controllers 209 of one or more LV devices 208 to be programmable and function according to certain logic rules and thresholds without the use, or with limited use, of a hardware processor. The PDM 220 can also have one or more of a number of other hardware and/or software components, including but not limited to a storage repository, memory, an application interface, and a security module. Similarly, the controller 290 and/or a POL control module 209 of one or more LV devices 208 in the system 200 can include one or more software and/or hardware components, including but not limited to those listed above for the PDM 220.

Figure 3:
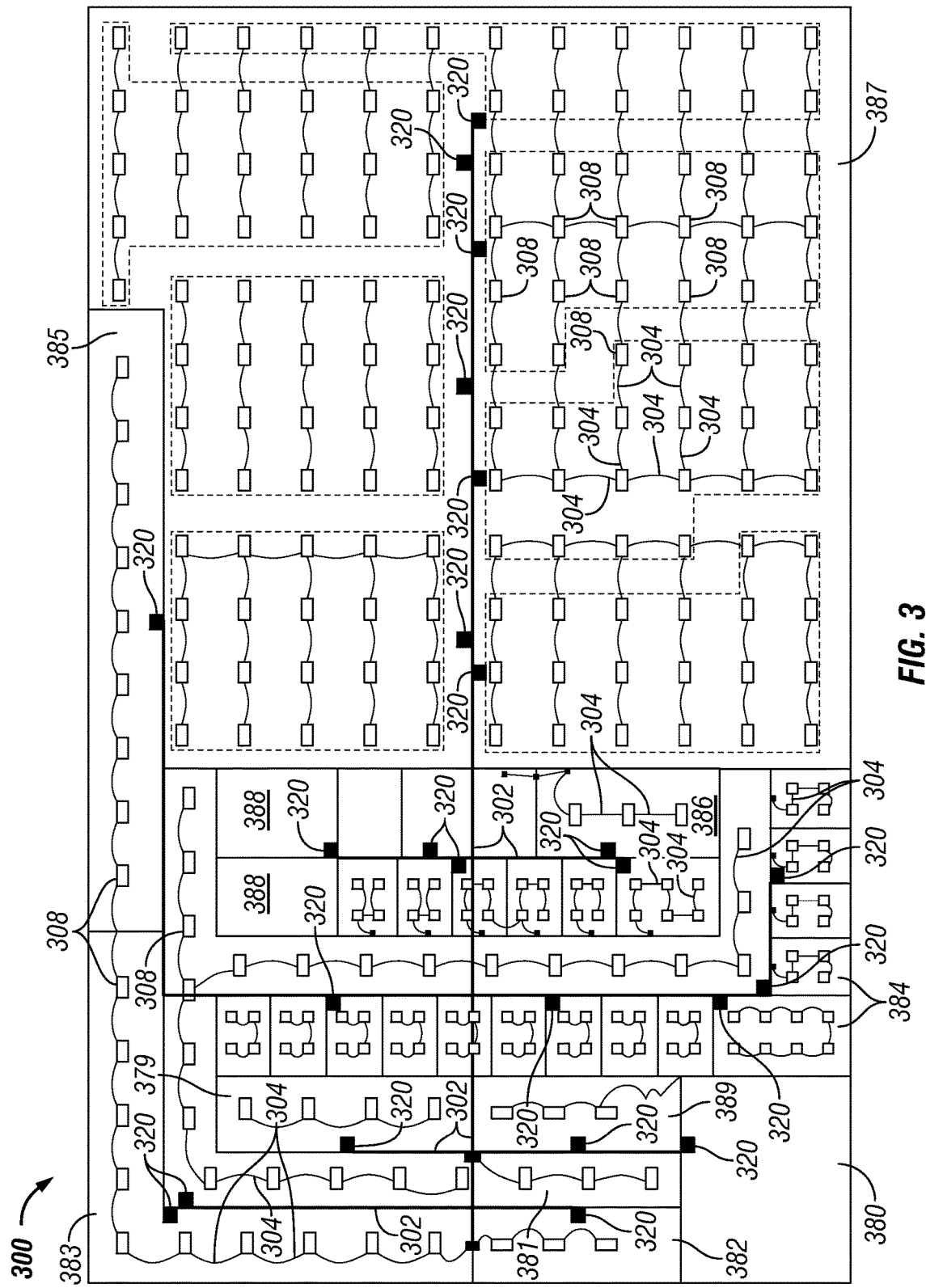
FIG. 3 shows a system diagram of another distributed low voltage power system in accordance with certain example embodiments.

FIG. 3 shows a system diagram of another distributed low voltage power system 300 in accordance with certain example embodiments. In one or more embodiments, one or more of the components shown in FIG. 3 may be omitted, repeated, and/or substituted. Accordingly, embodiments of distributed low voltage power systems should not be considered limited to the specific arrangements of components shown in FIG. 3.

Referring to FIGS. 1-3, the system 300 in this case is in a single-story, multi-occupant office building. The office building can include a lobby 300, a number of storage rooms (e.g., storage room 385, storage room 386), a large conference room 387, a number of office areas (e.g., office area 379, office area 382, office area 383, office area 384, and office area 389), a number of small conference rooms 388, and a hallway 381 that connects all of the aforementioned office spaces. In this system 300, there are multiple PDMs 320, with at least one PDM 320 designated for each office space.

Referring to FIGS. 1-3, the system 300 in this case is in a single-story, multi-occupant office building. The office building can include a lobby 380, a number of storage rooms (e.g., storage room 385, storage room 386), a large conference room 387, a number of office areas (e.g., office area 379, office area 382, office area 383, office area 384, and office area 389), a number of small conference rooms 388, and a hallway 381 that connects all of the aforementioned office spaces. In this system 300, there are multiple PDMs 320, with at least one PDM 320 designated for each office space.

Figure 4:
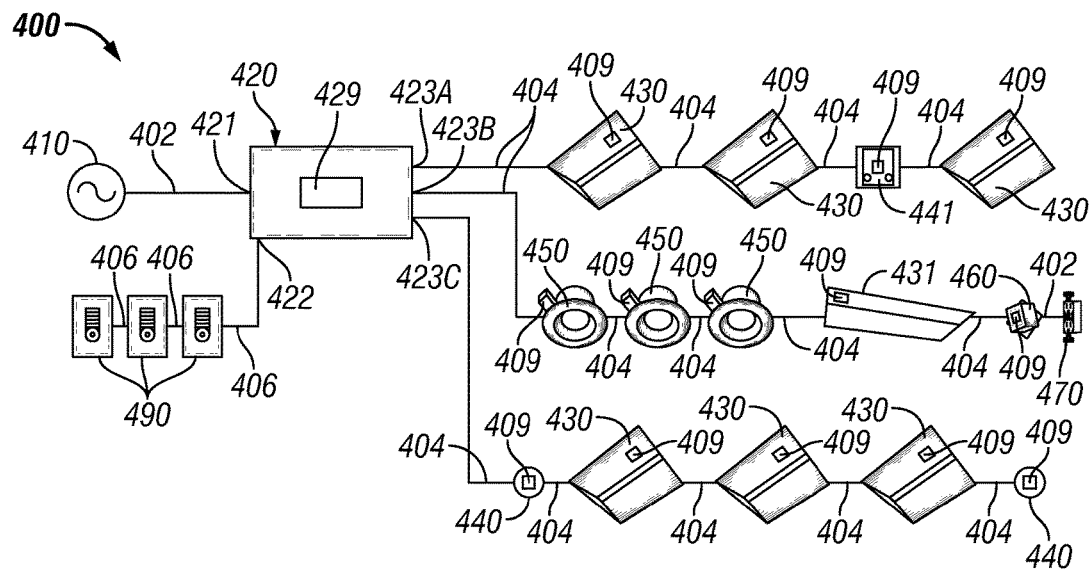
FIG. 4 shows a system diagram of yet another distributed low voltage power system in accordance with certain example embodiments.

FIG. 4 shows a system diagram of yet another distributed low voltage power system in accordance with certain example embodiments. In one or more embodiments, one or more of the components shown in FIG. 4 may be omitted, repeated, and/or substituted. Accordingly, embodiments of distributed low voltage power systems should not be considered limited to the specific arrangements of components shown in FIG. 4.

Referring to FIGS. 1-4, the system 400 of FIG. 4 has a PDM 420 that includes a power transfer device 429 and has input channel 421 and output channel 422. The PDM 420 receives line voltage power from power source 410 at input channel 421 through line voltage cable 402. The PDM 420 communicates with one or more (in this case, three) controllers 490 at output channel 422 through communication link 406. The PDM 420 also has three other output channels 423 (output channel 423A, output channel 423B, and output channel 423C) that provide LV signals through LV cables 404. Output channel 423A of the PDM 420 provides LV signals in series to two troffer lights 430, a photocell/timer 441, and another troffer light 430. Output channel 423B of the PDM 420 provides LV signals in series to three can lights 450, a different troffer light 431, and an inverter 460, which feeds AC power to a wall outlet 470 using a line voltage cable 402. Output channel 423C of the PDM 420 provides LV signals in series to a motion sensor 440, three light troffers 430, and another motion sensor 440.

As discussed above, in current embodiments, a single POL control module (e.g., POL control module 409) is used to control a single aspect of the operation of a single LV device. This leads to high costs, as the POL control module is relatively expensive relative to the other components of a LV device. In certain example embodiments, a new POL control module having multiple output channels is used to control multiple LV devices and/or multiple functions of a single LV device.

Figure 5:
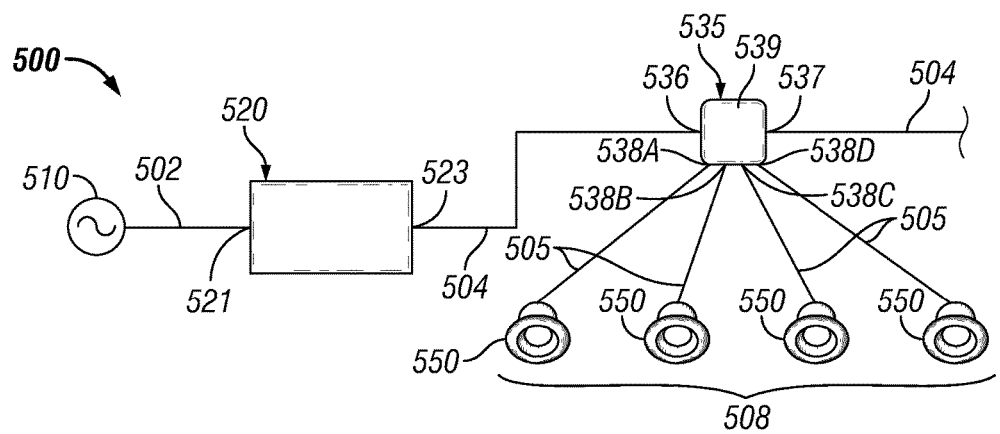
FIG. 5 shows a system diagram of still another distributed low voltage power system in accordance with certain example embodiments.

For example, FIG. 5 shows a system diagram of still another distributed low voltage power system 500 in accordance with certain example embodiments. Further, FIGS. 6A and 6B show a system diagram of yet another distributed low voltage power system 600 in accordance with certain example embodiments. In one or more embodiments, one or more of the components shown in FIGS. 5 and 6 may be omitted, repeated, and/or substituted. Accordingly, embodiments of distributed low voltage power systems should not be considered limited to the specific arrangements of components shown in FIGS. 5, 6A, and 6B.

Referring to FIGS. 1-6B, the system 500 of FIG. 5 is substantially the same as the system 400 of FIG. 4, except as described below. The PDM 520 receives line voltage power from power source 510 at input channel 521 through line voltage cable 502. In this case, there is only one output channel 523 of the PDM 520. The output channel 523 of the PDM 520 is coupled to an example multiple output channel POL control module 535 using a LV cable 504. The multiple output channel POL control module 535 functions substantially the same as the POL control module described above and currently used in the art, except that the output portion of the example multiple output channel POL control module 535 has multiple (in this case, four) output channels (in this case, output channel 538A, output channel 538B, output channel 538C, and output channel 538D).

In certain example embodiments, the multiple output channel POL control module 535 has a body 539 and includes an input portion (in this case, defined by input channel 536) and an output portion. The output portion can include multiple output channels (e.g., output channel 538A, output channel 538B, output channel 538C, output channel 538D), where each output channel 538 is coupled to a LV device 508. For example, as shown in FIG. 5, each output channel 538 is coupled to a can light 550.

The multiple output channel POL control module 535 can be coupled to the LV devices 508 using one or more communication links 505. A communication link 505 can be a LV cable 504, Ethernet cable, or some other wired technology. In addition, or in the alternative, the communication link 505 can be a network using wireless technology (e.g., Wi-Fi, Zigbee, 6LoPan). The multiple output channel POL control module 535 can be communicably coupled to one or more other PDMs in addition to the PDM 520 of the system 500.

The output portion of the multiple output channel POL control module 535 can also include an output channel 537 that allows the multiple output channel POL control module 535 to connect to, using a LV cable 504, another multiple output channel POL control module 535 and/or one or more other LV devices 508. The system 500 can have multiple output channel POL control modules 535, where each multi-output POL control module 535 of the system 500 provides power regulation and control to multiple LV devices 508.

In this case, since the input channel 536 of the multiple output channel POL control module 535 is connected via a LV cable 504, the multiple output channel POL control module 535 is classified as a Class 2 (low power, up to 100 Watts) device connected to a Class 2 network. In certain example embodiments, the multiple output channel POL control module 535 is a separate device from the LV devices 508 to which the multiple output channel POL control module 535 is coupled. In such a case, the multiple output channel POL control module 535 can be located physically proximate to the LV devices 508 to which the multiple output channel POL control module 535 is coupled.

By controlling the multiple LV devices 508 of FIG. 5 with the single multiple output channel POL control module 535, the cost of each LV device 508 is lower compared to similar LV devices currently used in the art because the LV devices 508 do not need a POL control module. Further, even though multiple LV devices 508 are controlled by the multiple output channel POL control module 535, the power regulation and control provided to one LV device 508 by the multiple output channel POL control module 535 can be the same as, and/or different than, the power regulation and control provided to the other LV devices 508 by the multiple output channel POL control module 535.

In addition, or in the alternative, a multiple output channel POL control module 635 can be integrated with a LV device 608 (e.g., the can light 650 of FIG. 6A). In such a case, the multiple output channel POL control module 635 can provide power regulation and control that address multiple functions (e.g., dimming, color selection) for a single LV device 608. For example, as shown in the system 600 of FIGS. 6A and 6B, the can light 650 includes a multiple output channel POL control module 635 that controls three different color outputs of the can light 650. As with the multiple output channel POL control module 535 of FIG. 5, the output portion of the example multiple output channel POL control module 635 has multiple (in this case, three) output channels (in this case, output channel 638A, output channel 638B, and output channel 638C).

In certain example embodiments, the multiple output channel POL control module 635 includes an input portion (in this case, defined by input channel 636) and an output portion. The output portion can include multiple output channels (e.g., output channel 638A, output channel 638B, output channel 638C), where each output channel 638 is coupled to a different portion (in this case, red LED 692, green LED 693, and blue LED 694, respectively) of the LV device 608. As such, the multiple output channel POL control module 635 can turn on/off each LED individually. The multiple output channel POL control module 635 can be coupled to the LEDs of the LV device 608 using one or more (in this case, one for each output channel) communication links 605. A communication link 605 can be substantially the same as the communication link 505 described above.

The input channel 636 of the multiple output channel POL control module 635 can be communicably coupled to one or more devices (e.g., a PDM) using a LV cable 604. The output portion of the multiple output channel POL control module 635 can also include an output channel 637 that allows the multiple output channel POL control module 635 to connect to, using a LV cable 604, one or more other components (e.g., one or more other LV devices 608) of the system 600. The system 600 can have multiple output channel POL control modules 635, where each multi-output POL control module 635 of the system 600 provides power regulation and control to multiple LV devices 608 and/or to multiple functions of a single LV device 608.

In this case, since the input channel 636 of the multiple output channel POL control module 635 is connected via a LV cable 604, LV device 608 that includes the multiple output channel POL control module 635 is classified as a Class 2 (low power, up to 100 Watts) device connected to a Class 2 network. In certain example embodiments, the multiple output channel POL control module 635 is part of the LV device 608 and controls multiple functions of the LV device 608. Examples of such functions can include, but are not limited to, color changing, warm dimming, CCT tuning, and up-down lights for a LV device 608 with multiple luminaires.

By controlling multiple functions of the LV device 608 of FIGS. 6A and 6B with the integrated single multiple output channel POL control module 635, the cost of the LV device 608 is lower compared to similar LV devices currently used in the art because the LV devices 608 do not need multiple POL control modules. Further, while not shown in FIGS. 6A and 6B, a hybrid situation between the system 600 of FIGS. 6A and 6B and the system 500 of FIG. 5 can be possible, where a multiple output channel POL control module 635 that is integrated with a LV device 608 can provide power regulation and control for one or more functions of that LV device 608 while also providing power regulation and control for one or more other LV devices 608 coupled to an output channel 638 of the multiple output channel POL control module 635.

A multiple output channel POL control module (e.g., multiple output channel POL control module 535, multiple output channel POL control module 635) can be configured and have communication capabilities (including programmability) such as those discussed above for the PDM and/or a controller (e.g., controller 290). For example, in order for each output channel of a multiple output channel POL control module to be individually controlled, each output channel can be configured in one or more of a number of ways to become enabled based on the content of a LV signal, the time of day, the occurrence of an event, and/or some other trigger.

Example embodiments provide a number of benefits. Examples of such benefits include, but are not limited to, reduction in energy usage; more simplistic installation, replacement, modification, and maintenance of a system; qualification as a Class 2 device and/or system; compliance with one or more applicable standards and/or regulations; less need for licensed electricians; reduced downtime of equipment; lower maintenance costs, avoidance of catastrophic failure; increased flexibility in system design and implementation; prognosis of equipment failure; improved maintenance planning; and reduced cost of labor and materials. Example embodiments can also be integrated (e.g., retrofitted) with existing systems.

Example embodiments are electrically safe. Example systems or any portion thereof can be free from risk (or a greatly reduced risk) of fire or electrical shock for any user installing, using, replacing, and/or maintaining any portion of example embodiments. For example, the LV signals that feed a device can allow a user to maintain the device without fear of fire or electrical shock. While Class 2 systems and SELV/PELV/FELV are described above, example embodiments can comply with one or more of a number of similar standards and/or regulations throughout the world.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A distributed low voltage power system, comprising:
   a power source generating line voltage power;
   a first line voltage cable comprising a first line voltage end and a second line voltage end, wherein the first line voltage end is coupled to the power source;
   a first power distribution module (PDM) comprising a first power transfer device, wherein the second line voltage end of the first line voltage cable is coupled to the first PDM, wherein the first PDM receives the input power from the power source through the first line voltage cable, wherein the first power transfer device generates a first low-voltage (LV) signal comprising a first instruction and a second LV signal comprising a second instruction from the input power, and wherein the first PDM comprises a first output channel;
   at least one first LV device coupled to the first PDM, wherein the at least one first LV device operates using the first instruction upon receiving the first LV signal, and wherein the at least one first LV device ignores the second LV signal based on the second instruction; and
   a first wireless communication link that couples the first output channel of the first PDM to the at least one first LV device, wherein the at least one first LV device receives the first LV signal and the second LV signal from the first PDM using the first wireless communication link.

2. The distributed low voltage power system of claim 1, further comprising:
   at least one second LV device coupled to the first PDM, wherein the at least one second LV device operates using the second instruction upon receiving the second LV signal, and wherein the at least one second LV device ignores the first LV signal based on the first instruction; and
   a second wireless communication link that couples the second output channel of the first PDM to the at least one second LV device, wherein the at least one second LV device receives the first LV signal and the second LV signal from the first PDM using the second wireless communication link.

3. The distributed low voltage power system of claim 1, further comprising:
   a second line voltage cable having a third line voltage end and a fourth line voltage end, wherein the second line voltage end is coupled to the power source;
   a second PDM comprising a second power transfer device, wherein the fourth line voltage end of the second line voltage cable is coupled to the second PDM, wherein the second PDM receives the input power from the power source through the second line voltage cable, wherein the second power transfer device generates a third LV signal comprising a third instruction and a fourth LV signal comprising a fourth instruction from the input power, and wherein the second PDM comprises a second output channel;
   at least one second LV device coupled to the second PDM, wherein the at least one second LV device operates using the third instruction upon receiving the third LV signal, and wherein the at least one second LV device ignores the fourth LV signal based on the fourth instruction; and
   a second wireless communication link that couples the second output channel of the second PDM to the at least one second LV device, wherein the at least one second LV device receives the third LV signal and the fourth LV signal from the second PDM using the second wireless communication link.

4. The distributed low voltage power system of claim 1, wherein the at least one first LV device comprises at least one first point-of-load (POL) controller that interprets the first instruction and the second instruction, and that tracks activity of the at least one first LV device and that is coupled to the first PDM using the first wireless communication link.

5. The distributed low voltage power system of claim 4, wherein the first PDM further comprises a PDM controller communicably coupled to the at least one first POL controller, wherein the PDM controller is configured to send local data to and receive the local data from the at least one first POL controller using the first wireless communication link.

6. The distributed low voltage power system of claim 5, further comprising:
   at least one external controller communicably coupled to the PDM controller of the first PDM, wherein the at least one external controller sends system data to and receives the system data from the PDM controller, wherein the system data comprises the local data.

7. The distributed low voltage power system of claim 4, wherein the first POL controller is coupled to the at least one first LV device using a second wireless communication link, wherein the first LV signal and the second LV signal are transferred from the first POL controller to the at least one first LV device using the second wireless communication link.

8. The distributed low voltage power system of claim 1, wherein the first LV signal is direct current power.

9. The distributed low voltage power system of claim 1, wherein the at least one first LV device qualifies as a Class 2 device.

10. The distributed low voltage power system of claim 1, wherein the first wireless communication link transfers power and communication signals between the first PDM and the at least one first LV device.

11. The distributed low voltage power system of claim 1, wherein the at least one LV device is used for lighting applications.

12. The distributed low voltage power system of claim 1, further comprising:
at least one multiple output channel point-of-load (POL) control module disposed between the first PDM and the at least one first LV device, wherein the at least one multiple output channel POL control module is coupled to the first wireless communication link, wherein the at least one multiple output channel POL control module receives the first LV signal and the second LV signal, wherein the at least one multiple output channel POL control module forwards the first LV signal to the at least one first LV device based on the first instruction, and the at least one multiple output channel POL control module withholds the second LV signal from the at least one first LV device based on the second instruction.

13. A power distribution module (PDM), comprising:
an input portion configured to receive high-voltage (HV) power from a power source;
a power transfer device electrically coupled to the input portion, wherein the power transfer device is configured to generate a first low-voltage (LV) signal comprising a first instruction and a second LV signal comprising a second instruction using the line voltage power; and
an output section electrically coupled to the power transfer device and comprising a plurality of channels, wherein each channel of the plurality of channels of the output section is configured to deliver, using at least one wireless communication link, the first LV signal and the second LV signal to at least one LV device, wherein the first instruction and the second instruction are addressable, wherein the at least one LV device operates using the first instruction upon receiving the first LV signal, and wherein the at least one first LV device ignores the second LV signal based on the second instruction.

14. The power distribution module of claim 13, further comprising:
a PDM controller configured to send local data to and receive the local data from at least one first local controller using the at least one wireless communication link, wherein the at least one wireless communication link transfers the first LV signal and the second LV signal to the at least one device.

15. The power distribution module of claim 14, wherein each of the first LV signal and the second LV signal comprises power and communications.

16. The power distribution module of claim 13, wherein each channel of the plurality of channels of the output section is further configured to receive, using at least one wireless communication link, a status of the at least one LV device.

17. A multiple output channel point-of-load (POL) control module, comprising:
an input portion configured to receive a first low-voltage (LV) signal comprising a first instruction and a second LV signal comprising a second instruction using at least one first wireless communication link;
a controller device electrically coupled to the input portion, wherein the controller device is configured to generate at least one distributed LV signal based on the first instruction of the first LV signal and to ignore the second LV signal based on the second instruction; and
an output section electrically coupled to the controller device and comprising a plurality of channels, wherein each channel of the plurality of channels of the output section is configured to deliver, using at least one second wireless communication link, the at least one distributed LV signal for use by at least one LV device.

18. The multiple output channel POL control module of claim 17, further comprising:
a body that houses the input section, the output section, and the controller device, wherein the body is disposed proximate to the at least one LV device.

19. The multiple output channel POL control module of claim 17, wherein the control device is disposed within the at least one LV device, wherein the at least one LV device comprises a plurality of LV functions, and wherein each channel of the plurality of channels is communicably coupled, using the at least one second wireless communication link, to each LV function of the plurality of LV functions.

20. The multiple output channel POL control module of claim 17, wherein the input portion is further configured to send, using the at least one first wireless communication link, a status of the at least one LV device to a power distribution module.

* * * * *

UNITED STATES PATENT AND TRADEMARK OFFICE
CERTIFICATE OF CORRECTION

| | | |
|---|---|---|
| PATENT NO. | : 9,812,874 B2 | Page 1 of 1 |
| APPLICATION NO. | : 15/216384 | |
| DATED | : November 7, 2017 | |
| INVENTOR(S) | : James Christopher Andrews et al. | |

It is certified that error appears in the above-identified patent and that said Letters Patent is hereby corrected as shown below:

Claim 1: Column 13, Line 45, after "receives" please delete the word "the" and insert the word --an--; and Claim 18: Column 16, Line 32, after "input" please delete the word "section" and insert the word --portion--.

Signed and Sealed this
Twentieth Day of February, 2018

Andrei Iancu
*Director of the United States Patent and Trademark Office*